Jan. 2, 1951  M. LEHMANN  2,536,068
INDUSTRIAL TRUCK

Filed June 19, 1948  4 Sheets-Sheet 1

INVENTOR.
MAX LEHMANN.
BY
Geo. B. Pitts
ATTORNEY.

Jan. 2, 1951 M. LEHMANN 2,536,068
INDUSTRIAL TRUCK
Filed June 19, 1948 4 Sheets-Sheet 3
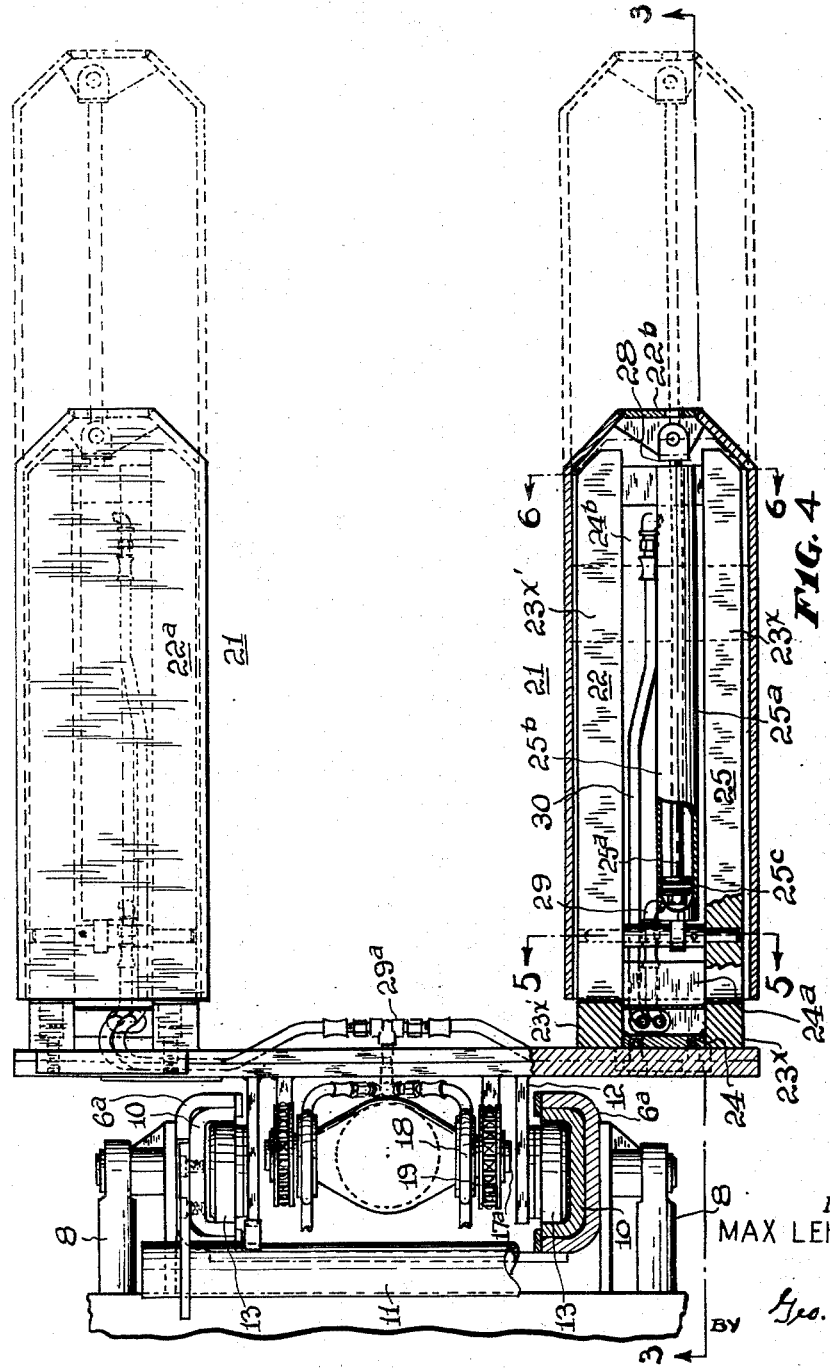
INVENTOR.
MAX LEHMANN.
BY Geo. B. Pitts
ATTORNEY Jan. 2, 1951 M. LEHMANN 2,536,068
INDUSTRIAL TRUCK
Filed June 19, 1948 4 Sheets-Sheet 4
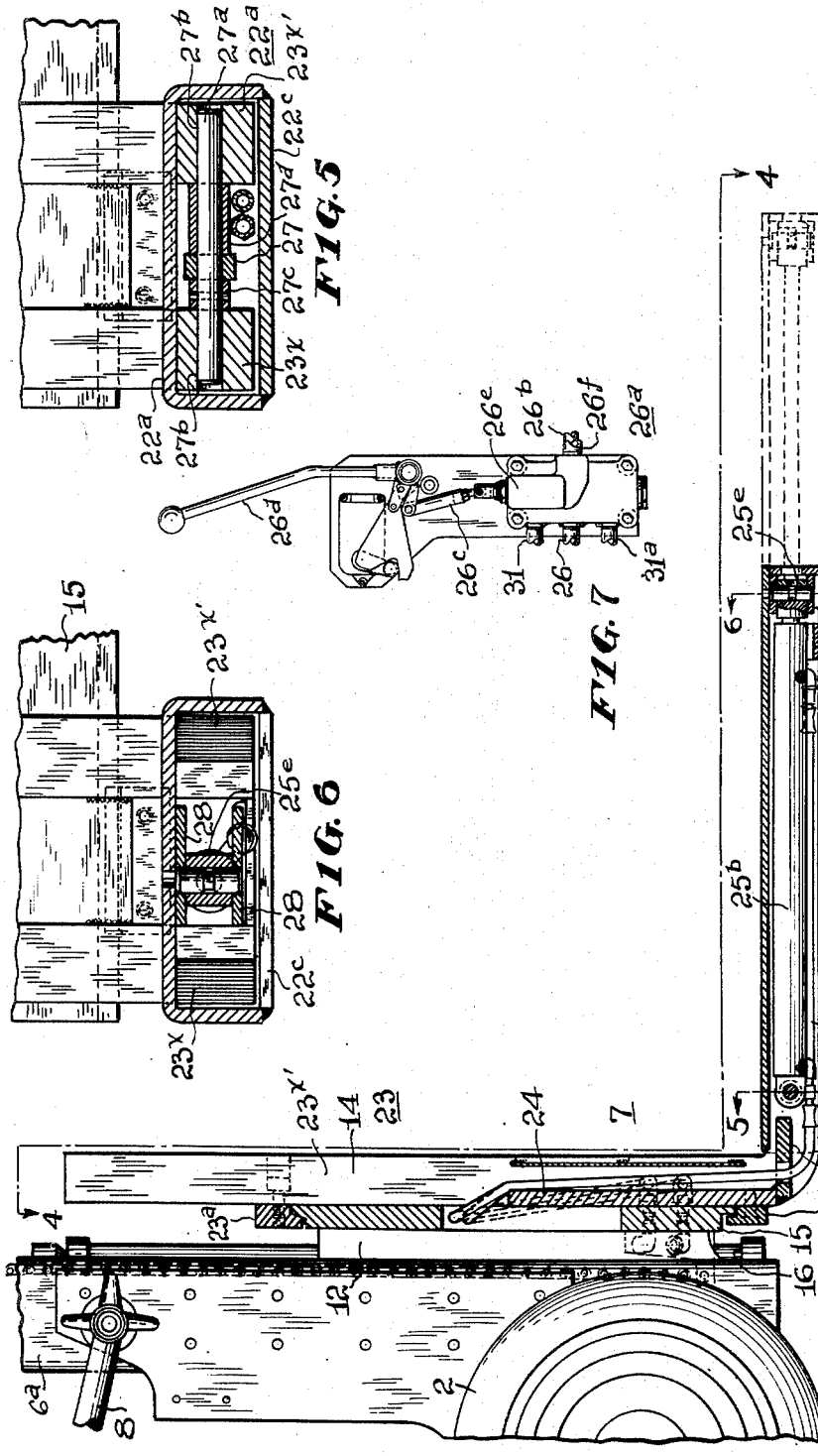
INVENTOR.
MAX LEHMANN
BY Geo. B. Pitts
ATTORNEY Patented Jan. 2, 1951

2,536,068

UNITED STATES PATENT OFFICE 2,536,068

INDUSTRIAL TRUCK

Max Lehmann, East Cleveland, Ohio, assignor to The Baker-Raulang Company, Cleveland, Ohio, a corporation of Ohio Application June 19, 1948, Serial No. 34,012

6 Claims. (Cl. 214—113)

This invention relates to an industrial truck of the elevating type adapted to carry loads varying in both weight and/or size. Where the loads are of relatively large size, the skids or pallets, on which the loads are positioned for pick-up and transportation, must be of a size commensurate with the base area of the load; accordingly, the load carrier must be of a length as well as width to support and transport the load in a stabilized condition. Under these conditions, the operation of picking up a load or discharging it often meets with a serious problem by reason of the limited area available to maneuver the truck into pick-up position or to effect backing of the truck after the load is discharged.

One object of the invention is to provide in a truck of this type an improved load carrier capable of being lengthened and shortened to enable the carrier to be readily projected below or within a skid, the skid and load thereon raised and transported and upon discharge of the skid the carrier shortened, whereby the total length of the truck may be reduced to permit maneuvering of the latter in carrying out these operations.

Another object of the invention is to provide an improved truck having a raisable load carrier consisting of a fixed section and a section slidable thereon to increase the supporting area of the carrier to accommodate varying sizes of loads.

Another object of the invention is to provide an improved truck having a raisable load carrier consisting of a fixed section, a section slidable endwise thereon outwardly and inwardly and power means between the sections, controlled at the driver's station, for operating the slidable section in each direction.

Another object of the invention is to provide in an industrial truck having a raisable member an improved load carrier consisting of a pair of L-shaped members relatively adjustable transversely on the raisable member and the load carrying forks of the L-shaped members having extensible sections to adapt the forks to loads of varying sizes.

Another object of the invention is to provide an improved truck having a raisable member for supporting a pair of forks each consisting of a section fixed to the raisable member and a section extensible outwardly to increase the supporting area of the forks, the extensible sections being retractible to permit maneuvering of the truck in limited areas.

Another object of the invention is to provide an improved truck having a member adapted to be raised and lowered and provided with a plurality of outwardly extending load carrying forks each consisting of telescopically related sections, one of which is fixed to the member, the other section being fluid operated endwise outwardly and inwardly to adapt the forks to large loads and permit maneuvering of the truck when picking up or discharging a load.

A further object of the invention is to provide an improved truck of the elevating type having load carrying forks capable of being extended varying distances dependent upon the size of the load to be transported.

Other objects of the invention will be apparent to those skilled in the art to which my invention relates from the following description taken in connection with the accompanying drawings, wherein Fig. 1 is a side elevation of a truck (somewhat diagrammatic) embodying my invention.

Fig. 3 is a section on the line 3—3 of Figs. 2 and 4.

Fig. 4 is a fragmentary section on the line 4—4 of Figs. 2 and 3.

Figs. 5 and 6 are sections on the lines 5—5 and 6—6, respectively, of Figs. 3 and 4.

Fig. 7 is a front elevation of the valve for controlling the operation of the slidable or extensible sections of the load carrier.

Figure 8:
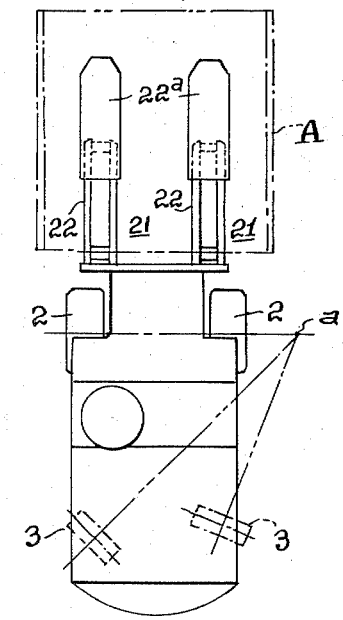
Figure 9:
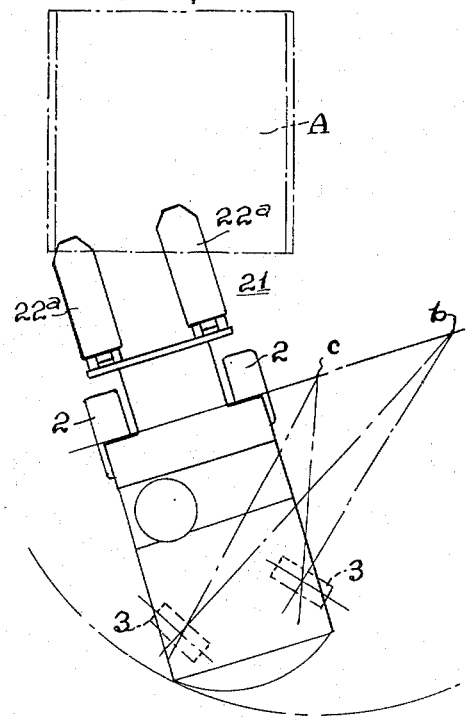
Figure 2:
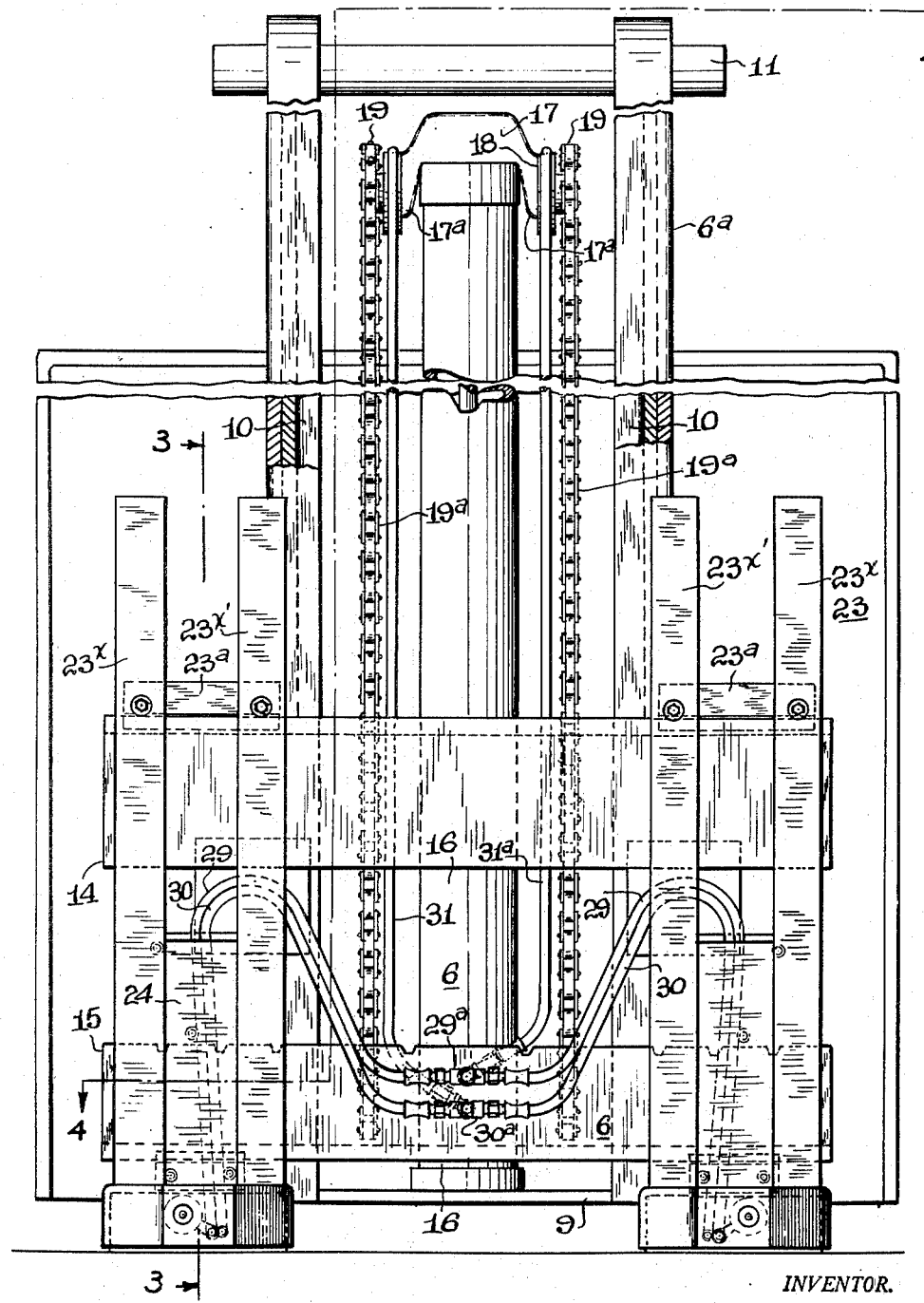
Fig. 2 is a view similar to Fig. 1a, enlarged.

Figs. 8 and 9 are diagrams showing the operation of maneuvering the truck to disengage the skid or pallet after discharging the load (the load on the skid or pallet not being shown).

Figure 1:
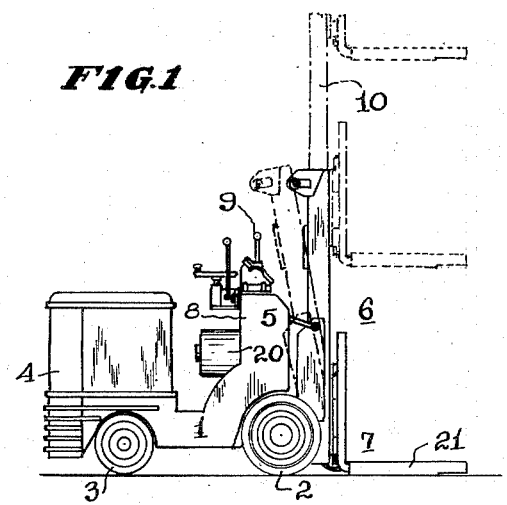
Fig. 1a is a front view of the truck.
Figure 1A:
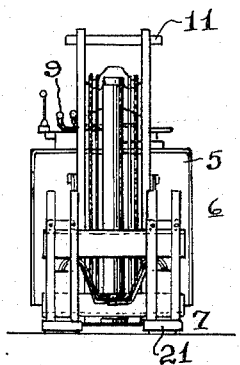

In the drawings, 1 indicates as an entirety a chassis mounted on front and rear wheels 2, 3, respectively. The wheels at either the front or rear of the chassis 1 may be driven and also steerably mounted. The mounting for the driving mechanism for the driven wheels and the power supply for the driving mechanism may be suitably supported on the chassis dependent upon the capacity of the truck and other factors. As these mechanisms and the mountings therefor form no part of the present invention and may be of any desired construction, illustrations of these mechanisms are omitted. In the exemplified form of construction, a casing 4 on the rear end of the chassis 1 houses the power supply and a casing 5 on the front end of the chassis 1 houses certain of the operating equipment for the truck, the space between the casing 4, 5, being utilized as the driver's station. 6 indicates as an entirety a fluid operated elevating mechanism for a load carrier 7 adapted to engage loads at different levels, transport them to a place of storage, shipment, assembly or other use and discharge them at the same or a different level. The elevating mechanism 6 is preferably mounted to swing inwardly to facilitate transportation of loads (see dotted lines in Fig. 1) on the carrier. The elevating mechanism 6 is preferably swung from its normal or vertical position (see Fig. 1), inwardly and outwardly by fluid operated means consisting of a cylinder at each side of the guides 6a, suitably supported in the casing 5 and have a reciprocatable piston connected by a rod 8 to the side wall of the adjacent guide 6a (see Fig. 3). The supply of fluid to the pistons is controlled by a suitable four-way valve of well known construction, operated by a lever (not shown).

The elevating mechanism 6 comprises the following: 6a indicates a pair of outer guides (already referred to) of channel shape in cross section fixedly connected at their lower ends to a base 9. 10 indicates a pair of inner guides of channel shape in cross section slidably fitting the guides 6a and connected together at their upper ends by a cross member 11. The elevating member consists of a pair of spaced plates 12, disposed between the guides 10, and (a) supporting on their outer sides upper and lower rollers 13, which engage and roll on the side walls of the guides 10, and (b) connected together at their outer side edges by upper and lower transversely extending supports 14, 15. In the form of construction shown, the supports 14, 15, are removably engaged by the load carrier 7, whereby different kinds of carriers for special types of loads may be substituted. The elevating member may be raised and lowered by suitable mechanism, that shown being of the fluid operated type and consisting of a cylinder 16, mounted on the base 9, and provided with a piston (not shown) having a rod 16a connected at its upper end to a yoke 17. The yoke is provided with arms 17a extending laterally to opposite sides of the cylinder 16 and terminate in shafts, each of which rotatably supports a pulley 18, for a purpose later set forth, and a sprocket 19 outwardly of the pulley 18. The sprockets 19 are engaged by chains 19a, the inner ends of which are suitably anchored to the base 9, whereas their outer ends are connected to the support 15, so that operation of the yoke 17 upwardly and downwardly will effect movement of the elevating member along the guides 10. Fluid under pressure is supplied to the lower end of the cylinder 16 from a pump (not shown) which is driven by a motor 20. As the disclosed form of mechanism for raising and lowering the elevating member forms no part of the present invention, a detail illustration thereof is omitted.

The load carrier 7 is constructed so as to be projected into pallets, for which reason it consists of two or more forks 21 extending outwardly from the elevating member and therefore it is equally adapted to engage skids and also loads supported in an elevated position relatively to the flooring by spaced bars. Each fork 21 consists of an inner section 22 and an outer section 22a endwise slidably fitting the inner section 22. By preference the inner fork section 22 is integrally connected to an upwardly extending leg 23, which connects the fork section 22 to the cross members 14, 15, by means of upper and lower engaging elements 23a, 23b. The elements 23a, 23b, removably interlock and adjustably engage the upper and lower side edges of the supports 14, 15, respectively. The upper engaging element 23a is preferably secured to the cross member 14 by cap screws, which when loosened permit the L-shaped member to be adjusted endwise of the cross members 14, 15.

Each fork section 22 and the adjacent leg 23a consist of two parallel L-shaped bars 23x, 23x', suitably connected together by plates 24, 24a, 24b. As shown, this arrangement readily adapts itself to the provision of a fluid operated mechanism, indicated as an entirety at 25, with the assembly of the power elements 25a thereof in direct connected relation between the fixed and movable fork sections and connection of those elements with the fluid pressure supply. The outer or extensible section 22a consists of an inverted U-shaped member substantially equal in length to the inner or fixed section 22, and closed at its outer end by a wall 22b; also, by preference, the lower ends of the sides of the U-member are connected together by a plate 22c. As shown, the sides of the U-member loosely engage the bars 23x, 23x', whereby the fork section 22a may be readily moved from normal position outwardly (as shown in dotted lines in Figs. 3 and 4) and inwardly.

The fluid operated mechanism 25 consists of a source of supply, such as a tank for oil, connected to a suitable pump, which is driven by the motor 20, the pump being connected by a pipe 26 with a valve 26a and the latter being connected by a pipe 26b with the oil tank to permit circulation of the oil to the tank when the valve 26 is in neutral position.

I provide separate power elements 25a, one for each fork 21, for simultaneously moving the outer fork sections 22a outwardly and inwardly. Each power element 25a consists of a cylinder 25b, having a reciprocatable piston 25c. The cylinder 25b is mounted between and in the plane of those portions of the bars 23x, 23x', which form the adjacent fork section 22. The inner end wall of the cylinder 25b is provided with an endwise extending lug 27 which is formed with an opening through which a pin 27a extends. The opposite ends of the pin 27a are supported in alined openings 27b formed in the bars 23x, 23x'. Suitable spacing devices 27c, 27d, are provided on the pin 27a between the lug 27 and bars 23x, 23x'. The pin 27a serves to support the inner end of the cylinder 25b on the bars 23x, 23x', and as one of the spacing devices 27c, 27d, is fixed to the pin 27a, the latter is held against endwise movement and the inner end of the cylinder 25b is rigidly held between the bars 23x, 23x'. The piston 25c is connected to a rod 25d, which extends through a suitable gland provided in the outer end wall of the cylinder 25b. The outer end of the rod 25d is provided with a knuckle 25e seated between a pair of spaced lugs 28, the latter extending inwardly from the end wall 22b of the adjacent fork section 22a and formed with alined openings which register with the opening in the knuckle 25e to receive a pin 28a, whereby the outer end of the piston rod 25d is connected to the fork section 22a, this connection serving to support the outer end of the cylinder 25b. The opposite ends of each cylinder are respectively connected to supply and discharge pipes 29, 30, which may be formed of metal or flexible material. The pipes 29 connected to the inner ends of the cylinders 25b extend to a union 29a, whereas the pipes 30 connected to the outer ends of the cylinders 25b lead to a union 30a, the unions being suitably supported intermediate the fork legs 23 on the support 15. The unions 29a, 30a, are connected by pipes 31, 31a, respectively, to the valve 26. The outer portions of the pipes 31, 31a, are formed of flexible material and are reeved about the pulleys 18, during raising and lowering of the elevating member, whereby the pipes 31, 31a, are supported at all times and slack therein is eliminated. The mounting of the liquid supply and discharge pipes 31, 31a, form the subject-matter of my co-pending application, filed Dec. 9, 1947, Ser. No. 790,571, for which reason no claim therefor is made herein.

The valve 26a is provided with a valve element which is operated through linkage 26c by a lever 26d, the linkage being releasably locked in neutral position of the lever 26d and either operated position thereof. In one operated position of the lever 26d, oil under pressure flows from the supply connection 26 and through the valve 26a, pipe 31a and pipes 29 to the inner ends of the cylinders 25b, the effect of which is to operate the pistons 25c and simultaneously move the fork sections outwardly any desired distance, whereas oil in the cylinders on the outer sides of the pistons 25c is discharged through the pipes 30, pipe 31, valve 26a and pipe 26b, which leads to the oil supply tank. In the other operated position of the lever 26d, oil under pressure flows from the connection 26 and through the valve 26a, pipe 31, pipes 30 to the outer ends of the cylinders 25b, the effect of which is to operate the pistons and simultaneously move the fork sections 22a inwardly, whereas oil in the cylinders 25b on the inner sides of the pistons is discharged through the pipes 29, pipe 31a, valve 26a and pipe 26b. In the event the oil supply is not cut off prior to movement of the fork sections 22a to the limit of their movement, back pressure in the system is relieved by a suitable valve 26e, which discharges through an outlet 26f.

Figs. 8 and 9 illustrate the operation of discharging a load and maneuvering the truck to disengage the skid or pallet A. Fig. 8 shows the fork sections 22a extended and supporting a skid or pallet (the load not being shown) and the truck having been driven into load discharge position, due to steering of the wheels 3 about the axis a. In this position, the elevating member is lowered to its down position, which effects engagement of the skid or pallet A with the flooring and disengagement of the forks from the skid or pallet. Where ample room prevails the truck may be backed rectilineally or substantially rectineally to remove the forks from beneath the skid; however, where the area is limited, the fork sections 22a are first moved inwardly and then the truck is backed, with the wheels 2 successively positioned for steering on one or more axes, as shown at b, c, to clear the skid or pallet. If a loading operation is to take place, the truck is initially maneuvered in the reverse direction into alinement with the skid or pallet A; the truck is then driven forward and the fork sections 22a extended (as shown in Fig. 8) after which the elevating member is raised to engage and elevate the skid. It will be observed that the forks are adapted to carry loads when the fork sections 22a are in retracted position, as well as in extended position. This construction therefore adapts itself to loads of varying sizes, but when transporting smaller loads or the truck is being driven without a load, the fork extensions may be moved inwardly, thereby shortening the over-all length of the truck and eliminating danger of accidents. Accordingly, the truck adapts itself to these varying conditions without employing a fixed carrier of a size to carry loads of maximum size.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck comprising a frame provided at one end thereof with substantially vertical guides extending from a point adjacent the travel surface for the truck upwardly, an elevating member, movable upwardly and downwardly on said guides substantially from end to end thereof, means for raising said member, a load carrier consisting of a section connected at its inner end to said member and extending outwardly therefrom in a direction longitudinally of said truck frame and a separate section slidably mounted on said first mentioned section and movable outwardly endwise of the latter to increase the load supporting area of said carrier outwardly of said elevating member, and power means connected to said separate section for moving it outwardly and inwardly relative to said first mentioned section.

2. A truck as claimed in claim 1 wherein said power means is fluid operated and includes a cylinder and a reciprocatable piston therein connected to said sections, respectively.

3. A truck as claimed in claim 1 wherein said load carrier comprises a plurality of forks each consisting of a section connected at its inner end to said elevating member and a separate section slidably supported on said first mentioned section and movable endwise outwardly relative thereto to increase the load supporting area of said carrier outwardly of said elevating member, and fluid operated means connected to said separate sections for simultaneously moving the latter outwardly away from said elevating member and simultaneously moving said separate sections in the opposite direction.

4. A truck as claimed in claim 1 wherein said load carrier comprises a plurality of forks each consisting of a section mounted on said elevating member for adjustment transversely and a separate section slidable on said fixed section outwardly and inwardly and fluid operated means for simultaneously moving said separate sections outwardly and for simultaneously moving said separate sections inwardly.

5. A truck as claimed in claim 1 wherein said load carrier comprises a plurality of forks each consisting of a section fixed to said elevating member and a separate section slidable on said fixed section outwardly and inwardly and the power means is fluid operated and includes a cylinder and a reciprocatable piston therein, the cylinder being supported on one of said sections and the piston is connected to the other section, fluid connections connected to the opposite ends of each of said cylinders and arranged to operate said separate sections simultaneously in either direction.

6. A truck as claimed in claim 1 wherein said load carrier comprises a plurality of forks each consisting of a section fixed to said elevating member and a separate section slidable on said fixed section outwardly and inwardly, said fixed section consisting of a pair of spaced parallelly related bars on which the adjacent separate section slides and the power means is fluid operated and includes a cylinder fixedly mounted between each said pair of bars, a piston reciprocatable in said cylinder and connected to the adjacent separate section and fluid supply connections connected to the opposite ends of each of said cylinders arranged to supply fluid simultaneously to corresponding ends of said cylinders, whereby said separate sections are simultaneously moved in either direction.

MAX LEHMANN.

REFERENCES CITED

The following references are of record in the file of this patent:

UNITED STATES PATENTS

| Number | Name | Date |
|---|---|---|
| 1,824,201 | Eisenberg | Sept. 22, 1931 |
| 1,878,995 | Abbe | Sept. 27, 1932 |
| 1,900,569 | Lederer | Mar. 7, 1933 |
| 1,910,398 | Ludington | May 23, 1933 |
| 2,320,601 | Howell | June 1, 1943 |
| 2,418,693 | Breslav | Apr. 8, 1947 |